United States Patent [19]
Vanderwerf

[11] Patent Number: 5,092,672
[45] Date of Patent: Mar. 3, 1992

[54] CONDENSER LENS SYSTEM FOR OVERHEAD PROJECTOR

[75] Inventor: Dennis F. Vanderwerf, Austin, Tex.

[73] Assignee: Minnesota Mining and Manufacturing Company, St. Paul, Minn.

[21] Appl. No.: 711,803

[22] Filed: Jun. 7, 1991

[51] Int. Cl.$^5$ .................... G02B 27/18; G03B 21/132
[52] U.S. Cl. ..................................... 353/102; 353/38; 353/DIG. 3
[58] Field of Search ................... 353/102, 69, DIG. 3, 353/95, 96, 63, 38, 24, 23, 98, DIG. 4

[56] References Cited

U.S. PATENT DOCUMENTS

| | | |
|---|---|---|
| 2,186,123 | 1/1940 | Rantsch et al. |
| 2,637,242 | 2/1949 | Osterberg et al. |
| 3,051,043 | 8/1962 | Miller |
| 3,241,440 | 3/1966 | Kugler ................................. 353/38 |
| 3,302,517 | 2/1967 | Henkel ............................... 353/102 |
| 3,486,817 | 12/1969 | Hubner ................................. 353/98 |
| 3,505,771 | 4/1970 | Thompson |
| 3,915,568 | 10/1975 | Yamada et al. ....................... 353/38 |
| 4,089,599 | 5/1978 | Kuboshima .................. 353/DIG. 3 |
| 4,436,392 | 3/1984 | Vanderwerf ........................ 353/102 |
| 4,436,393 | 3/1984 | Vanderwerf ........................ 353/102 |
| 4,741,613 | 5/1988 | Vanderwerf ........................ 353/102 |

OTHER PUBLICATIONS

Wallin, W., "Design of Special Projector Illumination Systems," *Journal of the SMPTE*, Oct. 1962, pp. 769–771.

Weiss, H., "Wide-Angle Slide Projection," *Information Display*, Sep./Oct. 1964, pp. 8–15.

*Primary Examiner*—William A. Cuchlinski, Jr.
*Assistant Examiner*—William C. Dowling
*Attorney, Agent, or Firm*—Gary L. Griswold; Walter N. Kirn; David W. Anderson

[57] ABSTRACT

This invention consists of a wide-angle, multi-element condenser system for an overhead projector that provides uniform illumination at the plane of the projection transparency, and a well-formed lamp image at the entrance pupil of the projection lens. This is accomplished by using a combination of a glass spherical meniscus lens, a glass plano-convex spherical lens and a plastic aspheric Fresnel lens system.

11 Claims, 2 Drawing Sheets

CONDENSER LENS SYSTEM FOR OVERHEAD PROJECTOR

BACKGROUND OF THE INVENTION

1. Field of the Invention

This invention relates to overhead projectors, and in particular, those of the transmissive type.

2. Description of the Prior Art

The use of multi-element lenses in a light condensing and illuminating system is well known in small format projection devices such as movie and slide projectors. In these cases the illumination leaving the lenses is convergent and is directed through a film or slide gate. There have been many attempts to increase the uniformity of illumination through this film gate, while at the same time minimizing the spherical aberration of the light source image at the entrance pupil of the projection lens. Especially for high numerical aperture condensing systems, the well-known $COS^4$ Law of Illumination makes it difficult to achieve uniform illumination.

The relationship of illumination uniformity, spherical aberration, and the $COS^4$ Law of Illumination is well described in Wallin, W., "Design of Special Projector Illumination Systems", *Journal of the SMPTE*, October, 1962, pp. 769-771 and Weiss, H., "Wide-Angle Slide Projection", *Information Display*, September/October, 1964, pp. 8-15.

Several methods have been proposed to increase the illumination uniformity of convergent light in small format condenser systems. Rantsch, U.S. Pat. No. 2,186,123 places a pair of multi-lens arrays between a pair of spherical glass condenser lenses to increase the light uniformity at the film plane. Miller, U.S. Pat. No. 3,051,043, tilts and decenters the light source and pair of condenser lenses relative to the optic axis to improve the uniformity at the film gate. Osterberg et al., U.S. Pat. No. 2,637,242, uses a pair of aspheric surface glass lenses to increase the illumination uniformity at the film gate and preserve the focusing accuracy. Hund, DE Patent 3,505,771, also used aspheric surface glass lenses to produce convergent illumination and improve the illumination uniformity at the film gate.

Overhead projectors have a much larger stage or film gate than considered in the above-described systems. Therefore any practical combination of condenser lenses normally produces divergent illuminating light to fill the stage area. Convergence of the light to the projection lens is then accomplished by the use of a large-area Fresnel lens located adjacent to or forming the stage plane. The purpose of the condenser is to illuminate the stage area, and this is usually accomplished by a single glass lens. This is generally a positive meniscus lens, or a plano-convex lens with a spherical or aspherical surface. One exception is a two-element glass system described by E. Hubner (U.S. Pat. No. 3,486,817) in which convergent illumination forms a secondary image of the light source close to the condenser at the position of a folding mirror.

It is an intent of the current invention to provide a highly uniform light distribution at a large format film gate, such as that for an overhead projector. This uniformity is especially important for the use of LCD (liquid crystal display) projection panels, which are placed on the stage of overhead projectors. The non-uniformity of illumination at the stage produced by many high intensity overhead projectors causes uneven heating of the liquid crystal material across the stage plane. This, in turn, causes uneven contrast in the projected image.

It is also an intent of the current invention to provide a light condensing system that collects radiation from the light source over a wide angle. This is especially important for isotropic radiating light sources, such as a high-intensity plasma discharge lamp.

SUMMARY OF THE INVENTION

The above objects are accomplished by providing a multi-element wide-angle light condensing system for use in an overhead projector. The system provides highly uniform illumination at the stage of the overhead projector, by combining dual spherical glass condenser lenses with dual element plastic aspheric Fresnel lenses. High collection efficiency achieved by the system provides high light levels at the projected image. The uniform illumination makes the system especially useful for LCD projection panels used in conjunction with overhead projectors.

DESCRIPTION OF THE DRAWINGS

The present invention will be more particularly described with reference to the accompanying drawings, wherein like numbers refer to like parts in the several views, and wherein.

DESCRIPTION OF THE PREFERRED EMBODIMENT

Figure 1:
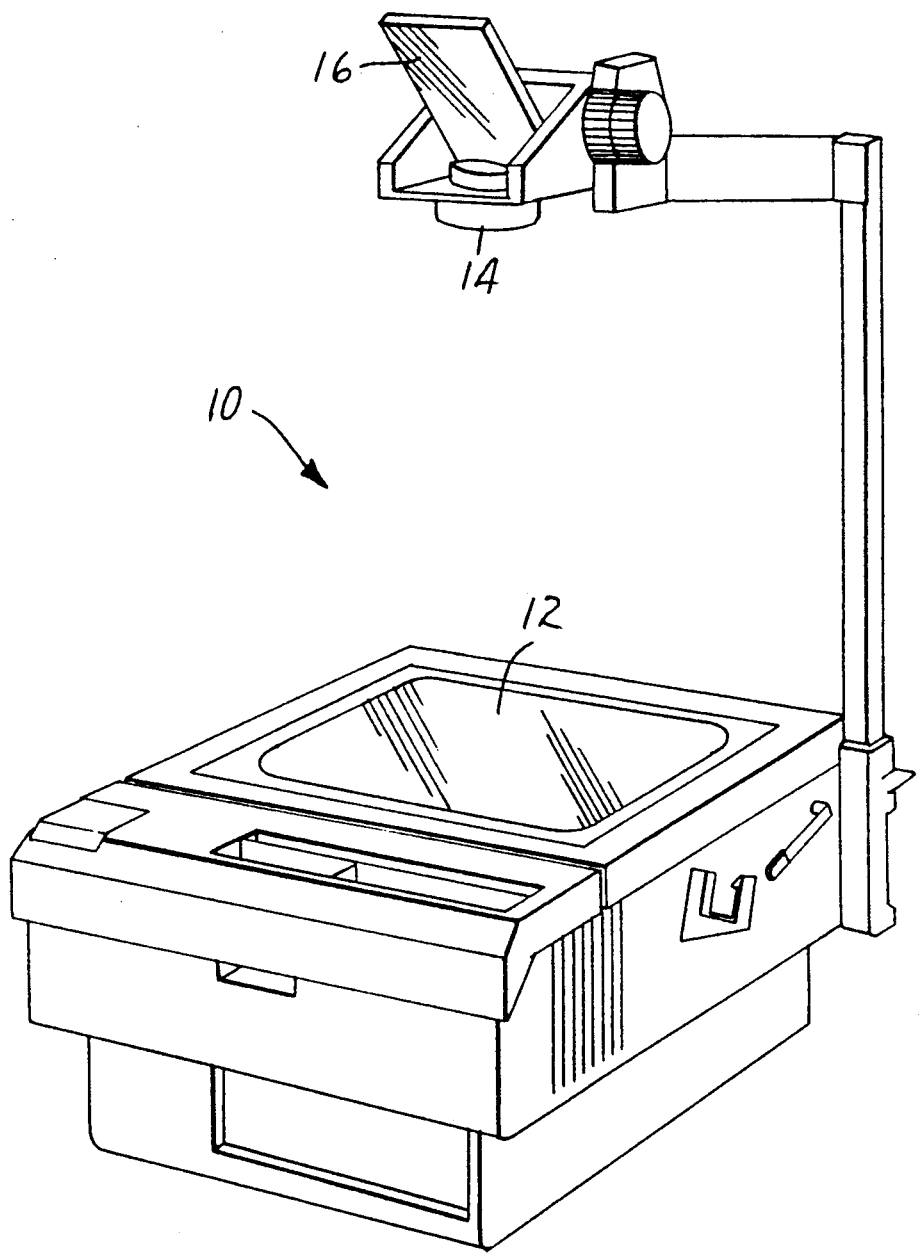
FIG. 1 is a perspective view of an overhead projector of the present invention.

FIG. 1 illustrates a typical overhead projector 10 which could advantageously use the lens system of the present invention. The projector 10 includes a stage 12 upon which a transparency or other object to be imaged may be placed, a projection lens 14 supported above the stage 12 and a plane mirror 16 for directing an image of the transparency onto a distant, substantially vertical surface. Light necessary to produce the image is provided by a light source and lens system located within the body of the projector under the stage.

In prior projectors, a single glass meniscus lens between the light source and the stage was used as a light condenser.

The increasing angular separation of the diverging light rays leaving this lens, from the center to the edge, causes a significant fall-off of illumination incident at the transparency plane of the overhead projector. For example, the separation of incident light rays increases as the distance from the optic axis increases. Also, due to the $COS^4$ Law for a Lambertian source, the illumination fall-off becomes worse as the angle from the optic axis increases. These two effects are especially detrimental in high numerical aperture systems such as the overhead projector considered herein.

Figure 2:
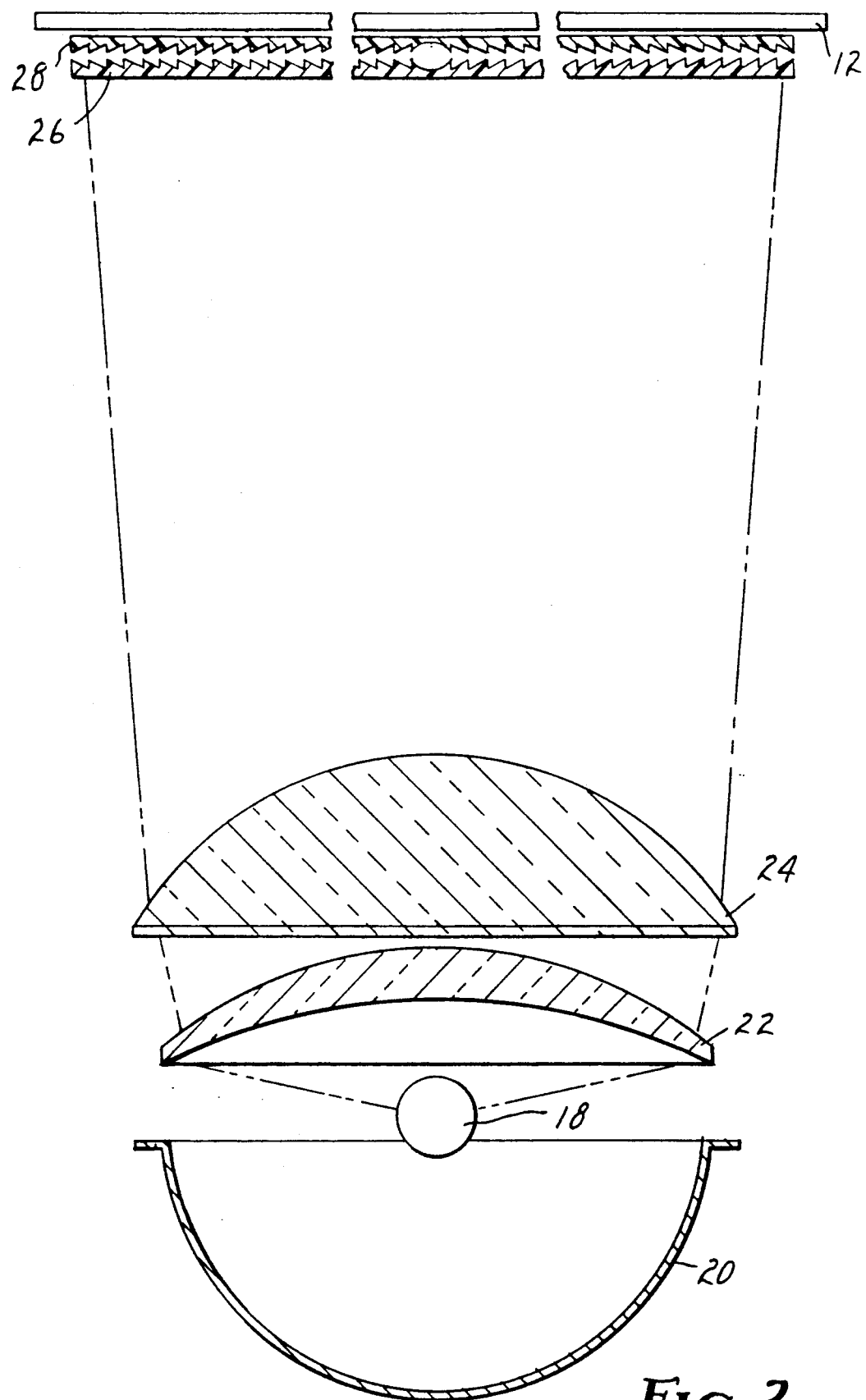
FIG. 2 is a schematic representation of a lens system used in the projector of FIG. 1.

FIG. 2 shows the illumination system of the current invention. The illustration of FIG. 2 is not to scale, particularly in that the Fresnel lenses and stage appearing in the upper portion of FIG. 2 have a largest dimension approximately four times that of the condensing lenses appearing in the lower portion of the drawing. This illumination system consists of a light source 18, a mirror 20, a glass positive meniscus lens 22 closely spaced to a glass positive plano-convex lens 24 and a Fresnel lens system 26, 28. It is preferred that the two Fresnel lenses 26 and 28 be a doublet for manufacturing efficiency and economy, but the Fresnel lenses 26 and 28 need not be a doublet.

The light source 18 is preferably an isotropic plasma discharge lamp, but may be an incandescent Lambertian source. The curved surfaces of the glass lenses 22, 24 are spherical, and the profile of the grooved surfaces of the Fresnel lenses 26, 28 are aspherical. These lenses 22-28 form an image of the light source 18 at the entrance pupil of the projection lens 14. The glass condensers 22, 24 of the current invention produce a nearly constant or decreasing angular separation of the exiting light rays. This distribution provides a more uniform illumination at the overhead projector stage 12, giving a more uniform projected image. This illumination distribution is achieved by introducing considerable spherical aberration in the divergent light rays exiting the glass condenser lenses 22, 24. The aspherical profile of the Fresnel lenses 26, 28 then corrects the spherical aberration of the glass lenses 22, 24, such that a good image of the light source 18 will be formed at the entrance pupil of the projection lens 14.

Light from an isotropic light source 18 enters the first glass lens 22 at equal solid angle increments. As the light rays exit the second glass lens 24, the angular separation of the rays decreases such that the virtual image distance of the light source 18 from the actual position of the light source 18 appears to increase. At extreme radial positions on the Fresnel lens 26 this spherical aberration causes adjacent rays to actually intersect. The Fresnel lens system 26, 28 cannot correct for the spherical aberration resulting from these bi-directional light rays, and all the rays would not be focused to a common point at the projection lens 14. This effect is minimized in two ways. First, the power and aperture of the plano-convex lens 24 are chosen such that rays from the outer edge of this lens 24 intersect only at locations on the Fresnel lens 26 which are well removed from its center. Secondly, this intersection point is controlled to be just outside the corner of the stage 12 diagonal, which acts as a stop. All remaining rays which fall within the stage area can then be brought to a common focus by the aspheric Fresnel lenses 26 and 28.

Another feature of this condenser system is high collection efficiency. It is known that a meniscus lens can be used in combination with a plano-convex lens as a converging condenser, if the total power is divided nearly equally between the two. There are no such restrictions in the system of the current invention. Rather, the radius of the concave surface of the meniscus lens 22 is chosen such that the lens 22 can be positioned as close to the light source 18 as possible, still allowing the light source 18 to be removed for replacement. For this reason, this lens 22 is often manufactured from a heat-resistant low-expansion borosilicate glass, such as PYREX. The plano-convex lens 24 is an optical crown glass, such as type B270. The Fresnel lenses 26, 28 are manufactured from even less heat-resistant acrylic plastic.

The system of the current invention can be utilized for overhead projection when the following system requirements are satisfied.

$$1.91 f_{12} < f_1 < 23.5 f_{12}$$

$$1.06 f_{12} < f_2 < 2.09 f_{12}$$

$$0.44 f_{12} < f_3 < 2.64 f_{12}$$

$$0.82 f_{12} < d_{23} < 5.49 f_{12}$$

where:

$f_1$ = focal length of the glass meniscus lens 22

$f_2$ = focal length of the glass plano-convex lens 24

$f_3$ = focal length of the plastic aspheric Fresnel lens system 26 and 28

$d_{23}$ = distance between the glass plano-convex lens 24 and the Fresnel lens system 26 and 28

$f_{12}$ = combination focal length of the meniscus lens 22 and the plano-convex lens 24

EXAMPLE

A specific design for a condenser system which fulfills the requirements of the current invention has $f_{12} = 100.17$ mm, $f_1 = 3.49 f_{12}$, $f_2 = 1.35 f_{12}$, $f_3 = 1.82 f_{12}$, and $d_{23} = 2.81 f_{12}$.

This includes a spherical back reflector 20 having a diameter of 90 mm and a radius of curvature of 46.1 mm. It is designed to collect and redirect back radiation from the light source 18 over a large collection angle, consistent with the ability to easily remove the light source 18 for replacement. The heat-resistant borosilicate meniscus lens 22 has a focal length of 350 mm, a diameter of 92 mm, a radius of curvature of the surface closer to the light source 18 of 151.69 mm and a radius of curvature of the surface farther from the light source of 80.93 mm. The optical crown plano-convex lens 24 has a focal length of 135 mm, a diameter of 113 mm and a radius of curvature of the surface farther from the light source of 70.59 mm. The Fresnel lens system 26, 28 has a combined focal length of 182.5 mm and the overhead projector 10 has a 10.5" (side-to-side) stage 12. The projection lens 14 is a 317 mm Cooke type triplet. With a 575 watt plasma discharge lamp 18 of the metal halide type operating at 95 volts, it is possible to obtain 6000 screen lumens with an overall projected light uniformity (edge-to-center ratio) exceeding 75%.

I claim:

1. A lens system for use in an overhead projector including a stage for supporting an object to be imaged, a light source disposed along an optic axis perpendicular to a plane defined by the stage, and a projection lens disposed along the optic axis opposite the stage relative to the light source, the lens system comprising:

a spherical meniscus lens disposed adjacent said light source and having an axis disposed on the optic axis;

a plano-convex spherical lens located between said meniscus lens and the stage and having an axis disposed on the optic axis;

an aspheric Fresnel lens system disposed adjacent the stage and between said plano-convex lens and the stage; wherein said meniscus lens and said plano-convex lens act in concert to introduce spherical aberration in divergent light rays exiting said plano-convex lens, and said aspheric Fresnel lens system corrects said spherical aberration to produce highly intense and uniform converging illumination at the stage.

2. The lens system according to claim 1 wherein the following requirements are satisfied for said lens system:

$$1.91 f_{12} < f_1 < 23.5 f_{12}$$

$$1.06 f_{12} < f_2 < 2.09 f_{12}$$

$$0.44\, f_{12} < f_3 < 2.64\, f_{12}$$

$$0.82\, f_{12} < d_{23} < 5.49\, f_{12}$$

wherein:
- $f_1$ = focal length of said meniscus lens
- $f_2$ = focal length of said plano-convex lens
- $f_3$ = focal length of said aspheric Fresnel lens system
- $d_{23}$ = distance between said plano-convex lens and said Fresnel lens system
- $f_{12}$ = combination focal length said meniscus lens and said plano-convex lens.

3. The lens system according to claim 1 wherein said meniscus lens is a heat-resistant, glass lens having a focal length of 350 mm.

4. The lens system according to claim 3 wherein said meniscus lens has a diameter of 92 mm.

5. The lens system according to claim 4 wherein said meniscus lens has a radius of curvature of the surface closer to said light source of 151.69 mm and a radius of curvature of the surface farther from said light source of 80.93 mm.

6. The lens system according to claim 1 wherein said plano-convex lens is a glass lens having a focal length of 135 mm.

7. The lens system according to claim 6 wherein said plano-convex lens has a diameter of 113 mm.

8. The lens system according to claim 7 wherein said plano-convex lens has a radius of curvature of the surface farther from said light source of 70.59 mm.

9. The lens system according to claim 1 wherein said Fresnel lens system is a Fresnel lens doublet.

10. The lens system according to claim 1 wherein said Fresnel lens system has a combined focal length of 182.5 mm.

11. The lens system according to claim 10 wherein said Fresnel lens system is a Fresnel lens doublet.

* * * * *